(12) United States Patent
Paterson-Brown et al.

(10) Patent No.: US 6,174,412 B1
(45) Date of Patent: Jan. 16, 2001

(54) COTTON LINTER TISSUE PRODUCTS AND METHOD FOR PREPARING SAME

(75) Inventors: Tim Paterson-Brown, Seattle, WA (US); Benjamin T. Painter, Chester, VA (US); Simon T. Zuanic, Lyndhurst (GB); Thomas A. White, Dalton, MA (US)

(73) Assignee: Purely Cotton, Inc., Arlington Heights, IL (US)

( * ) Notice: Under 35 U.S.C. 154(b), the term of this patent shall be extended for 0 days.

(21) Appl. No.: 09/259,594

(22) Filed: Mar. 1, 1999

Related U.S. Application Data
(60) Provisional application No. 60/076,831, filed on Mar. 2, 1998.

(51) Int. Cl.$^7$ .............................. D21H 11/12; D21H 17/28
(52) U.S. Cl. .............................. 162/95; 162/175; 162/72; 162/78; 162/88; 162/90
(58) Field of Search .................................. 162/95, 91, 99, 162/149, 141, 142, 147, 148, 175, 72, 78, 70, 88, 89, 90

(56) References Cited

U.S. PATENT DOCUMENTS

| | | |
|---|---|---|
| 2,039,312 | 5/1936 | Goldman . |
| 2,048,775 * | 7/1936 | Balton ..................................... 162/95 |
| 2,726,433 | 12/1955 | Skunda . |
| 2,737,466 | 3/1956 | Utermohlen et al. . |
| 2,777,779 | 1/1957 | Harwood et al. . |
| 2,841,202 | 7/1958 | Hirschy . |
| 2,865,783 | 12/1958 | Henderson et al. . |
| 3,014,832 | 12/1961 | Donnelly . |
| 3,017,317 | 1/1962 | Voigtman et al. . |
| 3,032,465 | 5/1962 | Selke et al. . |
| 3,035,956 | 5/1962 | Gonda et al. . |
| 3,047,444 | 7/1962 | Harwood . |
| 3,067,087 | 12/1962 | Gorski et al. . |
| 3,072,511 | 1/1963 | Harwood . |
| 3,205,124 | 9/1965 | Selke . |
| 3,215,589 | 11/1965 | Heller et al. . |
| 3,230,136 | 1/1966 | Krake . |
| 3,235,443 | 2/1966 | Greenbaum et al. . |
| 3,327,708 | 6/1967 | Sokolowski . |
| 3,377,224 | 4/1968 | Gresham et al. . |
| 3,385,572 | 5/1968 | Luoma et al. . |
| 3,484,330 | 12/1969 | Sokolowski et al. . |
| 3,520,016 | 7/1970 | Meitner . |
| 3,567,118 | 3/1971 | Shepherd et al. . |
| 3,592,732 | 7/1971 | Wand . |
| 3,602,965 | 9/1971 | Burger . |
| 3,616,122 | 10/1971 | Thomas . |
| 3,748,216 | 7/1973 | Brock . |
| 3,862,877 | 1/1975 | Camden . |
| 3,881,210 | 5/1975 | Drach et al. . |
| 3,903,889 | 9/1975 | Torr . |
| 4,362,781 | 12/1982 | Anderson . |
| 4,529,480 | 7/1985 | Trokhan . |
| 4,575,891 | 3/1986 | Valente . |
| 4,637,859 | 1/1987 | Trokhan . |
| 4,748,076 | 5/1988 | Saotome . |
| 4,946,617 | 8/1990 | Sheridan et al. . |
| 5,059,282 | 10/1991 | Ampulski et al. . |
| 5,114,771 | 5/1992 | Ogg et al. . |
| 5,143,776 | 9/1992 | Givens . |
| 5,173,351 | 12/1992 | Ruppel et al. . |
| 5,217,576 | 6/1993 | Van Phan . |
| 5,223,096 | 6/1993 | Phan et al. . |
| 5,228,954 | 7/1993 | Vinson et al. . |
| 5,240,562 | 8/1993 | Phan et al. . |
| 5,294,475 | 3/1994 | McNeil . |
| 5,322,647 * | 6/1994 | Reiche et al. ............................ 162/65 |
| 5,397,435 | 3/1995 | Ostendorf et al. . |
| 5,399,412 | 3/1995 | Sudall et al. . |
| 5,405,501 | 4/1995 | Phan et al. . |
| 5,494,731 | 2/1996 | Fereshtehkhou et al. . |
| 5,538,595 | 7/1996 | Trokhan et al. . |
| 5,562,964 | 10/1996 | Jones . |
| 5,575,891 | 11/1996 | Trokhan et al. . |
| 5,607,551 | 3/1997 | Farrington et al. . |
| 5,611,890 | 3/1997 | Vinson et al. . |
| 5,736,223 | 4/1998 | Laurent . |
| 5,976,320 * | 11/1999 | Lund et al. ............................ 162/52 |

FOREIGN PATENT DOCUMENTS

| | | |
|---|---|---|
| 1 916 063 | 5/1970 | (DE) . |
| 0 824 160 A1 | 2/1998 | (EP) . |
| 56 068 178 | 6/1981 | (JP) . |
| 61 012 991 | 1/1986 | (JP) . |
| 417 566 | 7/1974 | (SU) . |

OTHER PUBLICATIONS

Gary A. Smook, "Handbook for Pulp and Paper Technologies". pp. 195–196.

N.K. Ahuja et al., "Pulp and Paper Manufacture". pp. 111–112.

* cited by examiner

*Primary Examiner*—Stanley S. Silverman
*Assistant Examiner*—José A. Fortuna
(74) *Attorney, Agent, or Firm*—Mary R. Bonzagni, Esq.; Holland & Bonzagni, P.C.

(57) ABSTRACT

A soft, bright and strong tissue paper product and a process for preparing such a tissue paper product is provided. The inventive tissue paper product is prepared from raw cotton linter fibers and demonstrates unexpected medical benefits or advantages in addition to a balance of properties.

27 Claims, 9 Drawing Sheets

COTTON LINTER TISSUE PRODUCTS AND METHOD FOR PREPARING SAME

This application claims priority from provisional patent Application Ser. No. 60/076,831 filed on Mar. 2, 1998.

FIELD OF THE INVENTION

The present invention generally relates to cotton linter tissue products. More specifically, the present invention relates to cotton linter tissue products that demonstrate a balance of properties including softness or reduced coarseness and strength. The present invention further relates to a method for preparing such tissue products.

BACKGROUND OF THE INVENTION

Tissue products, such as facial tissues and toilet tissues, are relatively light-weight, low density papers that are undoubtedly recognized as a fundamental staple commodity. The prime source of fibers used in preparing these tissue products are wood pulp fibers having an average fiber length of from less than 1 millimeter (<1 mm) to approximately 2 mm. Such fibers include chemical wood pulps, such as sulfite and sulfate-process wood pulps (i.e., Kraft), and mechanical wood pulps, such as ground wood, ThermoMechanical Pulp (TMP) and ChemiThermoMechanical Pulp (CTMP). Pulps derived from both deciduous (i.e., hardwood) and coniferous (i.e., softwood) trees are used as fiber sources, in addition to fibers derived from recycled paper. These prior art tissue products further comprise minor amounts of chemical functional agents that include wet strength and dry strength binders, retention aids, surfactants, size, chemical softeners and the like, and reportedly demonstrate a balance of properties including strength and softness. It is noted that some of these prior art woodbased tissue products have a high degree of dusting or linting. Moreover, the inherent degree of coarseness associated with this fiber source, coupled with the presence of residual processing agents, results in a tissue product that could act as an irritant to users.

The above-referenced prior art tissue products are made from sheets of paper prepared using conventional papermaking processes and techniques, which include the steps of forming a pulp or aqueous fibrous slurry, depositing the slurry on a foraminous surface, such as a Fourdrinier wire or the surface of a forming cylinder employed in a cylinder mold papermaking machine, removing water from the deposited slurry by, for example, gravity or vacuum-assisted drainage, followed by adhering the resulting semi-dry sheet to the surface of a Yankee dryer, completely removing the water from the semi-dry sheet by evaporation, removing the essentially dry sheet from the Yankee dryer, and winding the resulting sheet onto a reel.

Papermaking fibers that are used in these tissue products are prepared by liberating individual fibers from the wood pulp into an aqueous slurry using conventional pulping methods and by refining, if necessary, to reduce fiber length.

The tissue industry has long recognized and sought to accommodate a segment of the general public that have existing medical conditions, such as external physical disruptions or maladies (e.g., swollen tissue), or that have demonstrated a propensity toward hypersensitive reactions to existing tissue products. Attempts to accommodate these individuals include the offering of tissue products that are devoid of fragrances, preservatives and other non-essential components or ingredients that may aggravate existing conditions or that may promote or encourage an allergic or other physical reaction thereto. However, even these altered products, presumably due in part to their inherent degree of coarseness, continue to present problems to this segment of the general public.

Economic and environmental concerns have prompted a recent trend in the tissue paper industry to reduce the amount of wood pulps used in products such as facial and toilet tissues. Methods of achieving such a reduction include the replacement of wood pulp fibers with high yield fibers or with fibers which have been recycled. Another such method is disclosed in U.S. Pat. No. 5,611,890 to Vinson et al. and involves the replacement of wood pulp with a lower cost, readily available filling material such as kaolin clay and calcium carbonate. Unfortunately, these methods generally tend to adversely affect the softness or tactile impression of these products.

The pleasing tactile impression of cotton has long been recognized and the use of cotton fibers has been common in some parts of the paper industry for a number of years. However, extending the use of this fiber source to tissue products presents significant technical and manufacturing hurdles at each stage in the production process from the selection of raw cotton linters through the linters pulping process and the tissue manufacturing process.

Raw cotton linters obtained from the cotton seed are characterized by grades that vary considerably in length, foreign particle or dirt content and in the degree of remnant staple fiber and gin motes. For example, first cut linters, which are principally used in banknotes and high quality stationary and document paper, are long (i.e., >10 mm) and contain staple fiber and gin mote remnants. As a result, significant refining and cleaning problems are presented when attempting to prepare a cotton linter pulp. Additional processing problems are presented when these linter pulps are used to prepare facial and toilet tissues. It has been observed by the present applicant that excessive "roping" of the fibers occurs when an aqueous fibrous slurry containing such raw cotton linters is passed through pumps and cleaners in a conventional tissue production process. It has also been observed that even if the fibers are subsequently shortened by refining and beating, in an attempt to improve the physical characteristics of the resulting sheet, the sheet is "pock-marked" with hard pills.

Second and third cut linters vary depending on the country of origin. For example, second cut linters from Asia or Europe are significantly longer than American second cut linters and has a tendency to have pills, but to a lesser degree than noted above. Asian and European third cut linters are shorter than American second cuts but have a higher dirt content.

The long nature of cotton linter fibers has been identified as contributing to observed plugging of disk refiners used in domestic pulp mills and tissue mills. In specific regard to double disk refiners used in domestic pulp mills, it has been observed that if the gap between the bars of the refiner is too narrow and too shallow to allow clear passage of the fiber, these gaps will plug with hard lumps of fiber resulting in a loss of refining capability and in defects in the pulp sheets in the form of hard nits, pills and strings.

Different grades of cotton linter pulps are commercially available. However, it is noted that no single grade of these commercially available pulps can be used to manufacture tissue products that demonstrate a balance of properties including softness or reduced coarseness and strength. In addition, the numerical representations of relevant fiber lengths quoted by pulp manufacturers are both inadequate and misleading. Moreover, it has been observed that a seemingly apparent equivalency between commercially available pulps does not guarantee the preparation of equivalent tissue products.

Two instruments (i.e., a Clark Classifier and a Bauer McNett Classifier) are used in the linter industry to quantify relative fiber length. Both instruments operate on the principle of collecting fibers from dilute slurries on screens of decreasing coarseness. For example, a Clark Classifier is usually equipped with screens of U.S. 14, 30, 50 and 100-mesh. An aqueous fibrous slurry is first passed through the 14-mesh screen. Long fibers are retained on the screen or in a reservoir upstream of the screen. This process is then repeated on the 30, 50 and 100-mesh screens. Each reservoir is then drained and the fibers collected and weighed. The weight percent of fibers retained on each screen and associated reservoir is a numerical presentation of relative fiber length. Generally, the percent retained on the 14-mesh screen is quoted in specifications for the various pulp grades.

As noted hereinabove, despite similar specifications, cotton linter pulps may have significantly different characteristics. By way of example, a grade sold as "refined first cut cotton linter pulp" will start with a relatively long fiber but will be heavily refined and cut before the pulp is dried. Grade specifications will include a fiber length of 45 to 55% on U.S. 14-mesh. This so-called "first cut based pulp" has a marked tendency to rope and form pills but yields a tissue product having good paper strength. In comparison, a grade sold as a filter pulp will start production with a relatively short fiber blend but will only be refined enough to form a sheet on the pulp dryer. Grade specifications will include a fiber length of 40 to 50%. This filter pulp grade forms few strings or pills but yields a tissue product having relatively poor paper strength.

In addition to the uncertainties presented by the inherent variety within each raw cotton linter grade and each commercial grade of cotton linter pulp, it is further noted that cotton fibers are known to entangle more readily than wood fibers, thereby presenting yet additional processing hurdles.

Conventional tissue mill equipment is designed to accommodate or process relatively clean wood pulp fibers having an average fiber length of from <1 mm to approximately 2 mm. As a result, the use of cotton linter pulps in the preparation of tissue products using such conventional equipment is immediately problematic. The process areas where the use of cotton linter pulp is the least compatible with conventional tissue mill equipment is in the stock preparation, pulping, pumping, refining and screening process areas. It has been observed that the use of these pulps results in fairly immediate plugging of the equipment where the screens and refiner(s) employed therein cannot provide the degree of cleaning and heavy refining needed without plugging. It is noted that refiners used in conventional tissue mills are generally undersized in that they cannot supply the necessary horsepower to process such cotton linter pulps.

There is a need in the art for a cotton fiber-based product that meets the needs of individuals with existing medical problems and the preferences of average consumers. It is therefore an object of the present invention to overcome the limitations and drawbacks detailed above.

It is a more specific object of the present invention to provide a tissue paper product prepared from cotton linter fibers.

It is an even more specific object to provide a tissue paper product that demonstrates a balance of properties including softness or reduced coarseness and strength.

It is yet a more specific object to provide a tissue paper product that reduces or eliminates any adverse reactions resulting from the use of such a product by individuals having existing medical conditions or hypersensitivities.

It is another object of the present invention to provide a process for preparing cotton linter tissue products that serves to overcome the significant technical and manufacturing problems presented by this fiber source.

It is yet a further object to provide a process for preparing a cotton linter pulp that may be readily processed in domestic tissue mills.

SUMMARY OF THE INVENTION

The present invention therefore provides a process for preparing a cotton linter pulp, which comprises subjecting an aqueous cotton linter slurry comprising cotton linter fibers having an average fiber length of from about 2 to about 16 mm to gentle, prolonged refinement by way of a Hollander type beater for a period of from about 2 to about 3 hours until an average fiber length of from about 0.3 to about 3.0 mm is obtained.

The present invention also provides a soft, strong tissue paper product prepared from raw cotton linter fibers having an average fiber length of from about 2 to about 16 mm and that comprises: cotton linter fibers having an average fiber length of from about 0.3 to about 3.0 mm and an effective amount of a cationic starch derivative.

The present invention further provides a process for preparing the above-described tissue paper product, which comprises:

selecting raw cotton linter fibers or blends thereof;
mechanically cleaning the selected fibers;
digesting the mechanically cleaned fibers to form a pulp;
bleaching the pulp;
beating or refining the bleached pulp until an average fiber length of from about 0.3 to about 3.0 mm is achieved; and
forming the bleached and refined pulp into a sheet.

The foregoing and other features and advantages of the present invention will become more apparent from the following description.

BEST MODE FOR CARRYING OUT THE INVENTION

Figure 1:
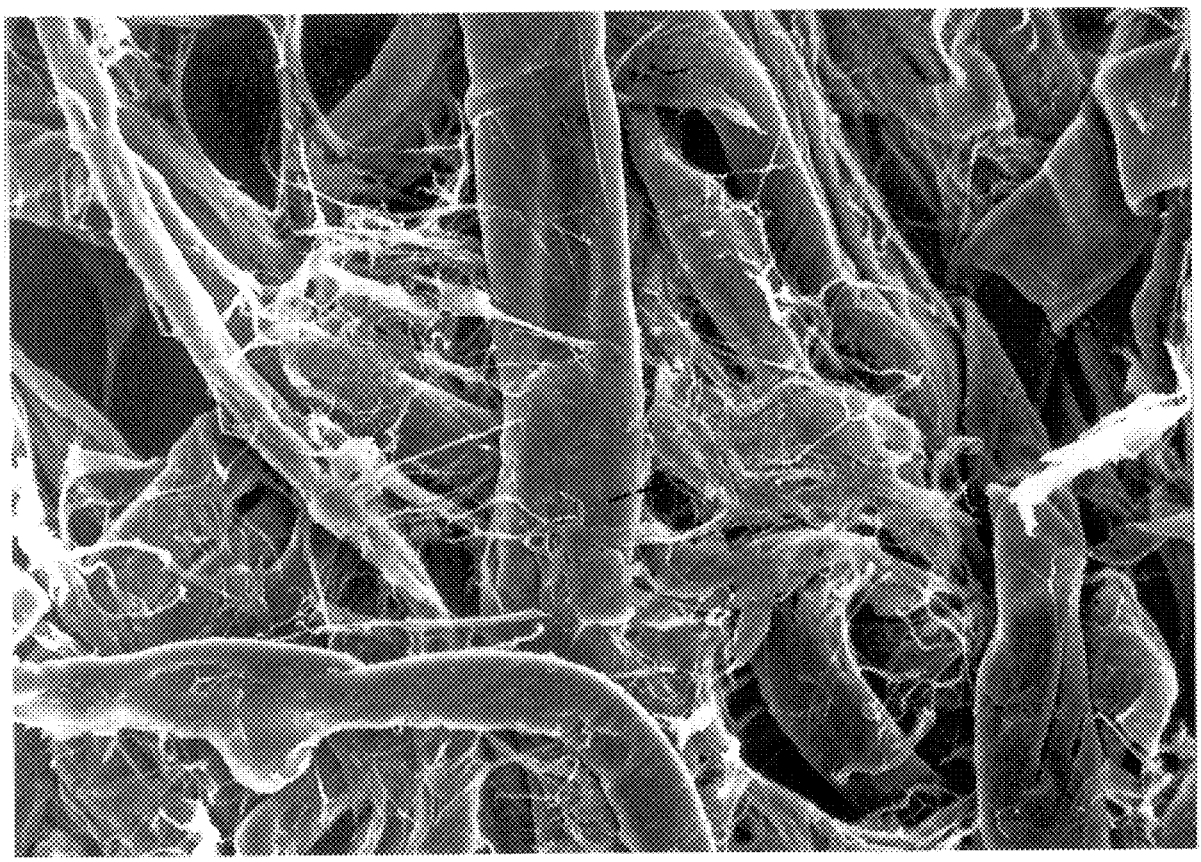
FIG. 1 is a scanning electron micrograph (1100× magnification) of the bathroom or toilet tissue paper product of the present invention.

The present invention involves the surprising discovery that the use of cotton linter fibers as the sole or predominant fiber source in the preparation of tissue products, such as facial and toilet tissue, and other non-woven products, is not only viable but serves to provide products that demonstrate unexpected medical benefits or advantages in addition to a balance of properties. Although the cotton linter fibers and pulp of the present invention are described hereinbelow mainly in association with the preparation of tissue products, the invention is not so limited. The cotton linter fibers and inventive cotton linter pulp prepared therefrom can be used to prepare other creped and non-creped non-woven products such as feminine hygiene products, other sanitary products, diaper liners and the like.

Preliminary medical studies involving the use of the present inventive tissue product by individuals having certain inflammatory conditions suggests that the use of this product serves to improve such conditions in a majority of those individuals tested. In particular, in a preliminary pilot study focusing on the use of the present invention by women affected by chronic or recurrent vulvar and vaginal infections and other inflammatory conditions has produced results demonstrating a statistically significant improvement in such conditions in regard to fissuring, secondary infection, pain and discharge.

A critical aspect of the present invention constitutes the selection and identification of a viable grade(s) of raw cotton linter fibers in addition to the preparation of a viable cotton linter pulp. As alluded to above, the physical characteristics of raw cotton linter fibers and the resulting pulp will determine the ability of conventional tissue mill equipment to process the material in addition to the physical characteristics of the resulting sheet.

The raw cotton linter fibers of the present invention have an average fiber length of from about 2 to about 16 mm and preferably comprise second cut cotton linters from America or Mexico or blends of second and third cut Asian cotton linters. When blends of second and third cut Asian cotton linters are employed, it is noted that blend ratios ranging from about 1:4 to about 1:1 (i.e., from about 20% to about 50% by weight second cuts and from about 80% to about 50% by weight third cuts) are preferred.

As used herein, the term "second cut cotton linters" means fibers removed from cotton seeds during a second passage of the cotton seeds through a delinting saw of a conventional linter machine, while the term "third cut cotton linters" means fiber removed from cotton seeds during a third passage of the cotton seeds through such a delinting saw.

The raw cotton linter fibers of the present invention generally demonstrate the following physical characteristics:

|  | Second Cut Cotton Linters from America | Second Cut Cotton Linters from Mexico | Second Cut Cotton Linters from Asia | Third Cut Cotton Linters from Asia |
|---|---|---|---|---|
| Average Fiber Length (mm) | 3–5 | 3–5 | 3–6 | 2–3 |
| Dirt and Seed Fragment Content (%) | 12 | 12 | 14 | 16 |
| Staple Fiber and Gin Mote Remnants (%) | 1–3 | 1–3 | 3–5 | 0 |

As suggested by the above-referenced physical characteristics, cotton linter pulp made from American or Mexican second cut cotton linters produces tissue with the best sheet formation, the fewest pills and the lowest dirt content. In addition, this pulp has the best handling characteristics in tissue mill equipment.

In a more preferred embodiment of the present invention, the raw cotton linter fibers have an average fiber length of from about 2 to about 10 mm and more preferably from about 4 to about 6 mm.

In yet a more preferred embodiment, the raw cotton linter fibers have an average coarseness measurement of from about 25 to about 70%, and more preferably from about 35 to about 55%. The term "coarseness", as used herein, means the percentage equivalent of the quotient of fiber cell wall thickness divided by the sum of fiber cell wall thickness and lumen diameter. By way of explanation, linter fibers, which have a more circular shaped lumen, typically demonstrate a fiber diameter of from about 0.7 to about 1.1 mils and a cell wall thickness of from about 0.16 to about 0.40 mils.

It is noted herein that the strength and opacity of the present inventive tissue products may be increased by employing minor amounts of fibers having average fiber lengths that fall outside the above-referenced ranges. In particular, longer fibers from long second cut cotton linters and mill runs may be used to impart strength. However, such fibers must not be too long or in a quantity sufficient to cause roping in the tissue mill equipment. Moreover, shorter fibers, such as short second cuts, third cuts or hull fiber, may be used to fill tissue sheet voids and thereby increase the opacity of the resulting sheet. In a preferred embodiment, from about 48 to about 72% by weight of longer fibers from American second cut cotton linters and from about 38 to about 52% by weight of shorter fibers from Asia are used in conjunction with the raw cotton linter fibers described hereinabove.

The term "mill runs", as used herein, means a blend of first and second cut linter fibers. The blend can be obtained in a single pass of the seeds through a linters machine by setting the delinting saw blade clearances in such a manner so as to remove both types of fibers. Such a blend can also be obtained by manually blending first cut cotton linters with second cut linters in a ratio of approximately 1:4, respectively.

The term "hull fiber", as used herein, means very short fibers that are separated from cotton seed hulls by beating fiber laden hulls in a defibrator.

The cationic starch derivative of the present invention is a naturally derived starch that has been chemically modified so as to impart a cationic moiety. The starch is preferably derived from corn or potatoes. In a more preferred embodiment, the cationic starch derivative of the present invention is potato starch.

The subject starch can be in granular form, pre-gelatinized granular form, or dispersed form. In a preferred embodiment, a 15 to 35% slurry of a potato starch derivative in water is employed. Suitable starches can be obtained from the National Starch and Chemical Company, Bridgewater, N.J., under the trade designations REDI-BOND 2038, 5330 and 5330A.

In a preferred embodiment, the cationic starch derivative is added to an aqueous fibrous slurry containing bleached, refined cotton linter pulp in an amount ranging from about 0.1 to about 5.6% by weight, based on the total weight of the cotton linter pulp at approximately 6% moisture content, and, more preferably, in an amount ranging from about 0.3 to about 1.3% by weight.

When the tissue paper product of the present invention is intended for use as a facial tissue, preferably from about 0.05 to about 3.0% by weight, and more preferably from about 0.1 to about 1.0% by weight of a wet-strength resin is also added to the aqueous fibrous slurry. A preferred wet strength resin can be obtained from Hercules Incorporated, Wilmington, Del. 19894-0001 under the trade designation KYMENE 557H wet-strength resin.

Other materials may be added to the aqueous fibrous slurry to promote ease of manufacture or to impart other characteristics or attributes to the tissue products as long as they do not adversely impact or affect the softness and/or strength of the inventive tissue product or its compatibility with individuals having existing medical conditions or hypersensitivities.

The tissue products of the present invention can be prepared from single-layered or multi-layered tissue paper webs and can take the form of single-ply tissue products or multi-ply tissue products.

In one embodiment, the inventive tissue product is a two-ply tissue product where each ply constitutes a single layer comprising: cotton linter fibers having an average fiber length of from about 0.3 to about 3.0 mm; and an effective amount of a cationic starch.

In another embodiment, the inventive tissue product is a one-ply tissue product comprising three contiguous layers, an inner or center layer comprising conventional wood pulp fibers and two outer layers, each comprising cotton linter fibers, as described above, and having a caliper or thickness ranging from about 0.06 to about 0.35 mm.

In yet another embodiment, the inventive tissue product is a two-ply tissue product where each ply constitutes a dual-layered sheet comprising a first layer made up of cotton linter fibers, as described above, and having a caliper or thickness of from about 0.02 to about 0.5 mm, and a second layer made up of conventional wood pulp fibers, and having a caliper or thickness of from about 0.08 to about 0.80 mm. The dual-layered sheets are plied with the wood pulp fiber layers facing each other such that each cotton linter fiber layer constitutes an outside layer.

Preferred tissue products according to the present invention have a basis weight of from about 1 to about 35 grams per square meter ($g/m^2$) and, more preferably, from about 6 to about 30 $g/m^2$. The density of the preferred tissue products is between about 0.02 and about 0.39 grams per cubic centimeter ($g/cm^3$) and, more preferably, between about 0.08 and 0.29 $g/cm^3$.

The tensile strength of preferred tissue products is $\geq 140$ grams per inch (g/in) for machine direction tensile strength (2-ply sheets, Tappi Method #494) and, more preferably, from about 190 to 330 g/in. While square sheets (i.e., machine direction tensile strength=cross direction tensile strength) are contemplated by the present invention, it is preferred that the cross direction tensile strength approximate about 60 to about 70% of the machine direction tensile strength.

To prepare the tissue products of the present invention it is necessary to first prepare an aqueous fibrous slurry or pulp, which is described hereinbelow.

PREPARATION OF AN AQUEOUS FIBROUS SLURRY OR PULP

Initially, raw cotton linter fibers are mechanically cleaned to remove field trash, seed hulls, cotton seeds and sand. Mechanical cleaning techniques are well known to those skilled in the art and include air separation techniques, where fibers are separated from the debris as a result of the density differences between these components, in addition to mechanical beating techniques. In a preferred embodiment, the raw fibers are mechanically cleaned by a four-stage mechanical beating system with air steam conveying and density separating steps between each stage. Mechanical cleaning takes place for a period of time ranging from about 1 to about 4 minutes until the bulk of the higher density debris has been separated from the lower density fibers.

Once the raw fibers are mechanically cleaned, they are preferably saturated with a 1.8% to 5.6% solution of sodium hydroxide and refined tall oil. In particular, the raw fibers are sprayed with the caustic solution and then mechanically pressed to remove the excess solution and to force penetration of the solution into the fibers, thereby setting the ratio of fiber to solution. It is preferred that the fiber to solution ratio range from about 1:3 to about 1:5.

The saturated fibers are then transferred to a digester where they are heated by direct steam injection. The purpose of the digestion step is three-fold. First, cottonseed oils and waxes are rendered water soluble by saponification to the sodium salts of fatty acids. Second, seed and hull fragments are dissolved. Third, the viscosity or molecular weight of the cellulose is adjusted.

The strength of the caustic solution, the fiber to solution ratio and digester temperatures, pressures and cooking times are all factors that determine or control linter viscosity. Moreover, digester temperatures, pressures and cooking times affect the brightness, dirt content, and strength of the final cotton linter tissue product. In particular, if the digestion process is too mild, the brightness of the resulting tissue product will be too low and the dirt content will be too high. If, on the other hand, the digestion process is too severe, the fibers will have reduced strength. In a preferred embodiment, the saturated fibers are digested at temperatures ranging from about 140° C. to about 195° C. and at pressures ranging from about 0.28 MPa to about 1.24 MPa for a period of time ranging from about 25 minutes to about three hours. The digested linters preferably have a viscosity ranging from about 50 to about 5,000 seconds, and more preferably, have a viscosity ranging from about 100 to about 1,000 seconds, as measured by the ACS Method published in *Industrial and Engineering Chemistry Analytical Edition*, Vol. 1, Page 49. Jan. 15, 1929. All viscosity values quoted in this document are the seconds required for the calibrated bead to fall 20 cm through a solution of 2.5 grams of cellulose dissolved in a solvent which has a composition of 165 grams of ammonia, 30 grams of copper, and 10 grams of sucrose.

In a more preferred embodiment, the saturated fibers are also subjected to an oxidation step at the digester. It is theorized that lignin associated with linter processing originates with the seed hulls and results in the formation of colored compounds when the cotton seed hulls dissolve during digestion. It has been discovered that the addition of an oxidation step at the digester reduces colored compounds and yields a brighter stock. As will be readily apparent to those skilled in the art, such a step enables a reduction, if not elimination, of the amount of chlorine-based bleaching agents that would subsequently need to be employed to produce an acceptable level of brightness in the resulting pulp.

The above-referenced oxidation step is preferably effected by one of two methods. In the first method, hydrogen peroxide ($H_2O_2$) is used as a delignification agent and is added to a 1.8% to 5.6% solution of sodium hydroxide and refined tall oil so as to effect a 1 to 5% solution of $H_2O_2$. The resulting peroxide solution is added to the linters as they are loaded into the digester. Digestion then takes place according to the process parameters described above. Good bleaching action from the peroxide is facilitated by the good mixing and the high temperature of digestion. It is noted that such a method does result in some decomposition of the peroxide which impacts upon the efficiency of this method.

In the second method, oxygen is used as the delignification agent. In particular, oxygen, in an amount ranging from about 0.11 to about 0.78 MPa per metric ton of raw fiber, is added to the digester prior to steam heating or at the end of the digester cycle. As will be readily apparent to those skilled in the art, the amount of oxygen added will be dependent upon the pressure limitation of the digester and the steam pressure that is used to cook the linters.

In an even more preferred embodiment, oxygen is used as the delignification agent and is added to the digester prior to steam heating. It has been further discovered that oxygen, in combination with the caustic solution and high temperature employed during digestion, reduces the viscosity of the cellulose to a greater degree than digestion with only the caustic solution at high temperatures. As a result, a 20 to 28% reduction in the steam pressure and therefore the temperature during the digestion cycle can be realized thereby increasing the efficiency of the overall digestion process.

As a final step prior to transferring the digested raw cotton linters from the digester, it is preferred that carbon dioxide be employed as a neutralizing agent for residual caustic. The use of carbon dioxide plays a role in producing a pulp with low ash content. As will be readily apparent, the resulting calcium content may be reduced by washing the digested linters with deionized water to remove the bicarbonate salt formed by way of the neutralization reaction.

Once the raw cotton linter fibers have been digested, the resulting pulp is transferred to a bleaching system. Bleaching may be conducted in accordance with conventional bleaching techniques using reduced quantities of elemental chlorine. It is preferred that such conventional techniques be conducted so as to effect a viscosity decrease in the range of from about 30 to about 55%. Decreases within this range result in high brightness pulp with minor reductions in pulp strength.

In a preferred embodiment, the use of elemental chlorine is eliminated. In particular, a mixture of sodium chlorite and sodium hypochlorite having a pH of from about 2.0 to about 4.5 is added to the digested fibers or pulp in an amount of from about 4 to about 12 kilograms of sodium chlorite per metric ton of fiber. The temperature in the bleaching system or device is then elevated to from about 48 to about 60° C. and that temperature maintained for from about 35 to about 55 minutes. It is noted that this combination of chemicals produces chlorine dioxide which becomes the primary bleaching agent.

Next, hydrogen peroxide, in quantities ranging from about 0.4 to about 1.4 weight percent on pulp, is added to the above-referenced bleaching mixture or liquor to replace hypochlorite bleaching in the second stage. A buffer for pH control (e.g., sodium silicate-sodium hydroxide solution) in quantities ranging from about 0.1 to about 0.7 weight percent on pulp is also added to the bleaching liquor, as well as, sequestering agents (e.g., magnesium sulfate) in quantities ranging from about 0.1 to about 0.3 weight percent on pulp. The temperature in the bleaching device is then elevated to from about 74 to about 88° C. and that temperature maintained for about 45 to about 70 minutes. In a preferred embodiment, the % solids of the bleaching liquor ranges from about 12 to about 19% solids.

Finally, the pulp is acidified to a pH of from about 2.5 to about 3.5 to reduce the ash content. Alternatively, from about 2 to about 5 kilograms of a 3:1 mixture of sodium chlorite and sodium hypochlorite is added to the bleached pulp to effect such a reduction in ash content. Preferably, the ash content is reduced to a level of from about 0.05 to about 0.65 weight percent dry pulp.

In a more preferred embodiment, bleaching is conducted with chlorine free chemicals. In particular, hydrogen peroxide is added to the digested fibers or pulp in an amount of from about 35 to about 90 kilograms of peroxide per metric ton of fiber. The temperature in the bleaching device is elevated to from about 71 to about 88° C. and that temperature maintained for about 50 to about 90 minutes. The peroxide bleaching step may be repeated if necessary to achieve the desired amount of brightness. Once the desired level of brightness is achieved, the fibers are washed in acidic water having a pH of from about 3 to about 5 for the purpose of removing the bleaching chemicals.

Surprisingly, cotton linter pulps produced with oxygen treatment during digestion and bleached with hydrogen peroxide have brightness values which are equivalent to linter pulps produced by conventional bleaching techniques. Moreover, pulps produced with oxygen and peroxide are stronger than pulps of equal brightness produced by conventional bleaching techniques. Once the pulp is bleached, it is transferred to a refining device where the fibers are cut and fibrillated.

The amount and type of refining has a significant, if not critical, impact on the quality of the finished product. It has been discovered that gentle, prolonged refinement by way of, for example, a Hollander type beater, provides a refined pulp that is processable by domestic tissue mills. In a preferred embodiment, the fibers are refined for a period of from about 2 to about 3 hours in a Hollander type beater until an average fiber length of from about 0.3 to about 3.0 mm is obtained.

After refining, an effective amount of a cationic starch derivative and other components, if desired, are added to the refined pulp.

PREPARATION OF A TISSUE PAPER WEB

In a non-integrated system (i.e., where the pulp mill is remote from the tissue mill), the bleached and refined pulp fibers are formed into a pulp sheet and delivered to the tissue mill. In an integrated system (i.e., where the pulp mill is connected to the tissue mill), the bleached and refined pulp fibers, in the form of an aqueous fibrous slurry, are typically delivered through a pipe line from the bleaching/refining area of the pulp mill to the tissue mill.

It is noted that stock slurry pumps that are employed in tissue mills for the purpose of moving aqueous fibrous slurries from one processing point to another are typically equipped with open-faced, multi-vane impellers, such as a 2–4 type, and are operated at low RPM (i.e., ≦1,800). It is further noted that pumps operated at higher speeds and with five vane and six vane impellers will plug when exposed to aqueous cotton linter slurries. It has been discovered and therefore is preferred, that the stock slurry pumps employed in the practice of the present invention comprise low-speed (i.e., 880 to 1,200 RPM), high volume pumps with large clearance (i.e., 4.4 to 7.6 centimeters) between vanes.

Once the bleached and refined pulp fibers are received within the tissue mill they are mechanically pulped for the purpose of fiber separation. In a preferred embodiment, a 3.0 to about 4.2% aqueous cotton linter slurry is mechanically pulped at ambient temperature for a minimum of 60 minutes in a system capable of effecting an agitation pattern that serves to avoid dead spots below the surface of the slurry and non-agitated stock floating on the slurry surface. In a more preferred embodiment, a 3.4 to about 4.4% aqueous cotton linter slurry is mechanically pulped as described above at a temperature ranging from about 49 to about 57° C. for a minimum of 40 minutes.

The mechanically pulped fibers are then subjected to either one or two refining steps whereby the fibers are preferably refined to a Canadian Standard Freeness of 400 to 680 milliliters drainage.

For tissue mills that are equipped with only one double disk refiner, it is preferred that the refiner employed therein be of adequate size to deliver 4.5 to 6.0 net applied horsepower day per ton of fibers processed ("net HPD/T"). By way of explanation, a double disk refiner has two sets of two superposed refining plates that form two interfaces. Each set of refining plates has one rotatable plate and one fixed plate, the distance between each set of plates being adjustable. As is well known to those skilled in the art, a fiber slurry is pumped through each interface where fibers are cut and refined by the cutting surface of each refining plate. As the refining plates are moved closer together, more fibers are cut and refined and more energy is applied to the fiber. The "net applied horsepower" is a measure of the energy applied to the fiber and, as used herein, means the difference between the available horsepower and the "no load horsepower" or the amount of horsepower needed to turn the plates when the distance or clearance between the plates is so large that no refining is taking place. As a general rule, the "net applied horsepower" is equal to approximately 80 to 85% of the available horsepower. For example, a refiner equipped with a 600 horsepower motor could deliver 480 to 510 net applied horsepower. Therefore, if a tissue mill tissue-making machine operated at 3.0 tons per hour or 72 tons per day, the net HPD/T would be between 6.67 and 7.08.

For tissue mills that are equipped with two refiners, it is preferred that the refiners be positioned in series and that a first refiner be equipped with plates that serve to provide more cutting than fibrillation. Such plates have slightly larger gaps between the bars, as compared to plates that provide more fibrillation than cutting, and therefore are less subject to plugging with linter fibers. This type of plate is available from J&L Machine Company, Waukesha, Wis., under the product designation 24-EJ 109/110 pattern and 24-EJ 127/128 pattern. It is further preferred that a second refiner be equipped with plates that provide slightly more fibrillation than the plates employed in the first refiner. Such plates are available from J&L Machine Company under the product designations 24-101/102 pattern and 24-EJ 103/104 pattern. As will be readily evident, by having two refiners in series, the degree of cutting and fibrillation can be adjusted to handle a range of fiber blends.

In another preferred embodiment, a refiner with a double disk configuration, which allows stock to flow through a first interface and then through a second interface, is employed. As will be readily evident, such a configuration allows one type of plate to be used to form the first interface and a second type of plate to form the second interface.

In a more preferred embodiment, two stock preparation systems, with each system having a dedicated refiner, is employed. Such an arrangement allows different types of cotton linter pulp to be treated or processed separately and then blended as opposed to first blending the fibers and then cutting and fibrillating the blended stock.

Once the fibers are refined, the aqueous slurry containing the refined fibers is diluted with recycled water until a fiber concentration of from about 0.1 to about 0.4% is achieved. The diluted slurry is then directed through pressure screens having slots measuring from about 1.0 to about 1.9 mm and/or holes measuring from about 1.0 to about 2.4 mm. The slurry is then directed to a head box of a papermaking machine where it is thoroughly mixed to provide a homogenous slurry prior to being deposited onto a forming wire or cylinder. The deposited slurry is then progressively dewatered to about 30% solids by means of gravity, vacuum-assisted drainage and mechanical pressing and then secured to a cylindrical surface of a steam heated Yankee dryer aided by an applied adhesive. Drying is completed on the Yankee dryer. The resulting dry web is then "creped" from the Yankee dryer by a doctor or crepe blade positioned at an angle of from about 8 to about 30° relative to the dryer surface and then wound into a roll.

For embodiments where the inventive tissue product is a two-ply product (e.g., where each ply constitutes a single layer comprising cotton linter fibers and cationic starch or starch derivative), and/or for embodiments where the inventive tissue product is a one-ply tissue product comprising three contiguous layers (e.g., an inner or center layer comprising conventional wood pulp fibers and two outer layers comprising cotton linter fibers), two stock preparation systems and a dual layer head box may be employed to allow for customizing each layer. In addition, two stock preparation systems and a single layer head box may also be employed to allow for two types of stock that can be subsequently metered into single layers at different ratios.

Figure 2:
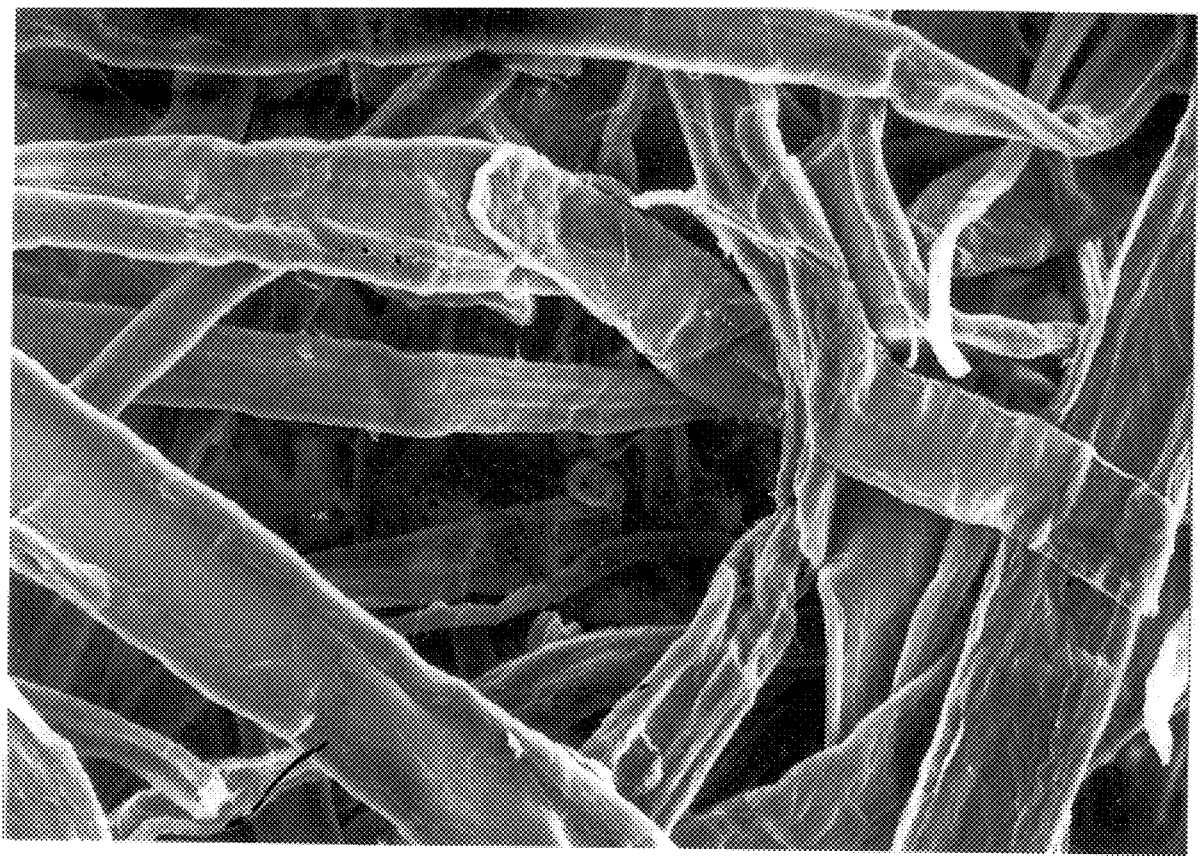
FIG. 2 is a scanning electron micrograph (1100× magnification) of a bathroom or toilet tissue paper product manufactured by The Proctor & Gamble Company, Inc. under the trade designation "CHARMIN" ("CHARMIN bathroom tissue")
Figure 3:
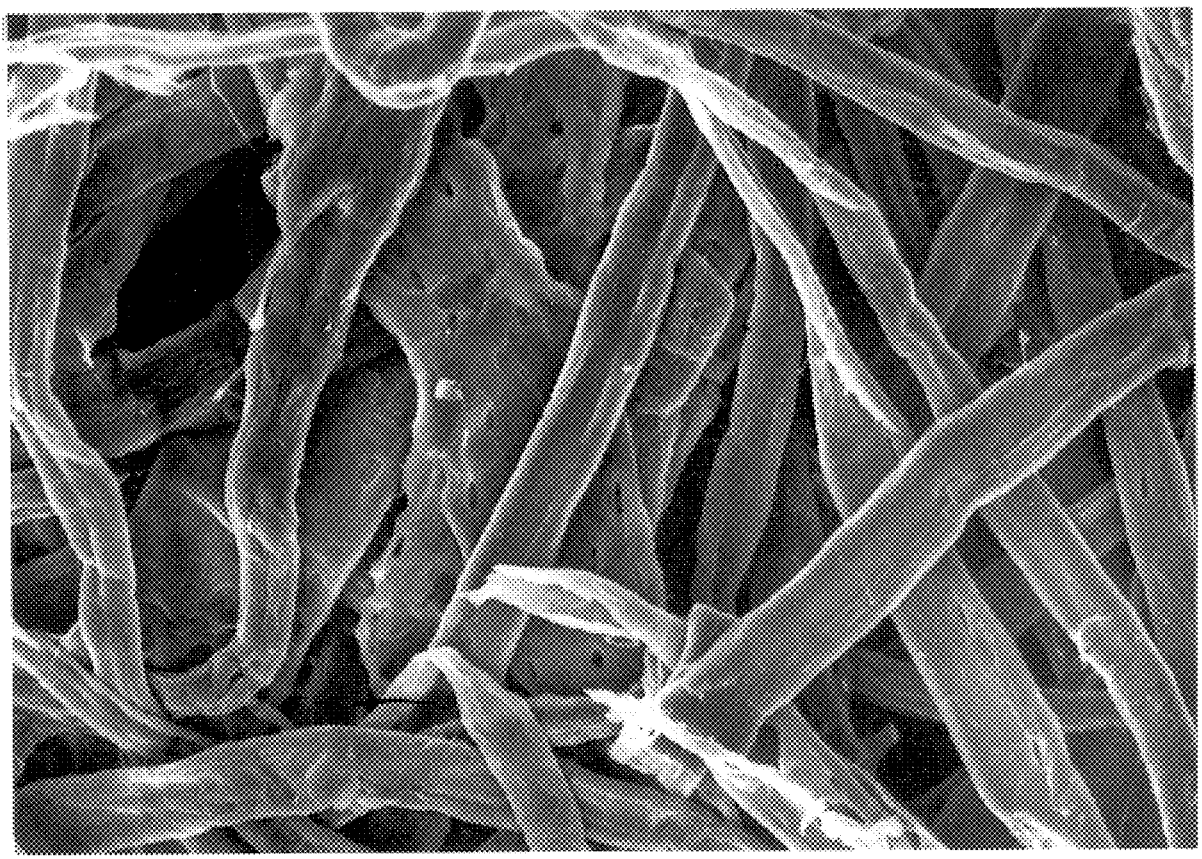
FIG. 3 is a scanning electron micrograph (1100× magnification) of a bathroom or toilet tissue paper product manufactured by Kimberly-Clark Corporation under the trade designation "COTTONELLE" ("COTTONELLE bathroom tissue")
Figure 4:
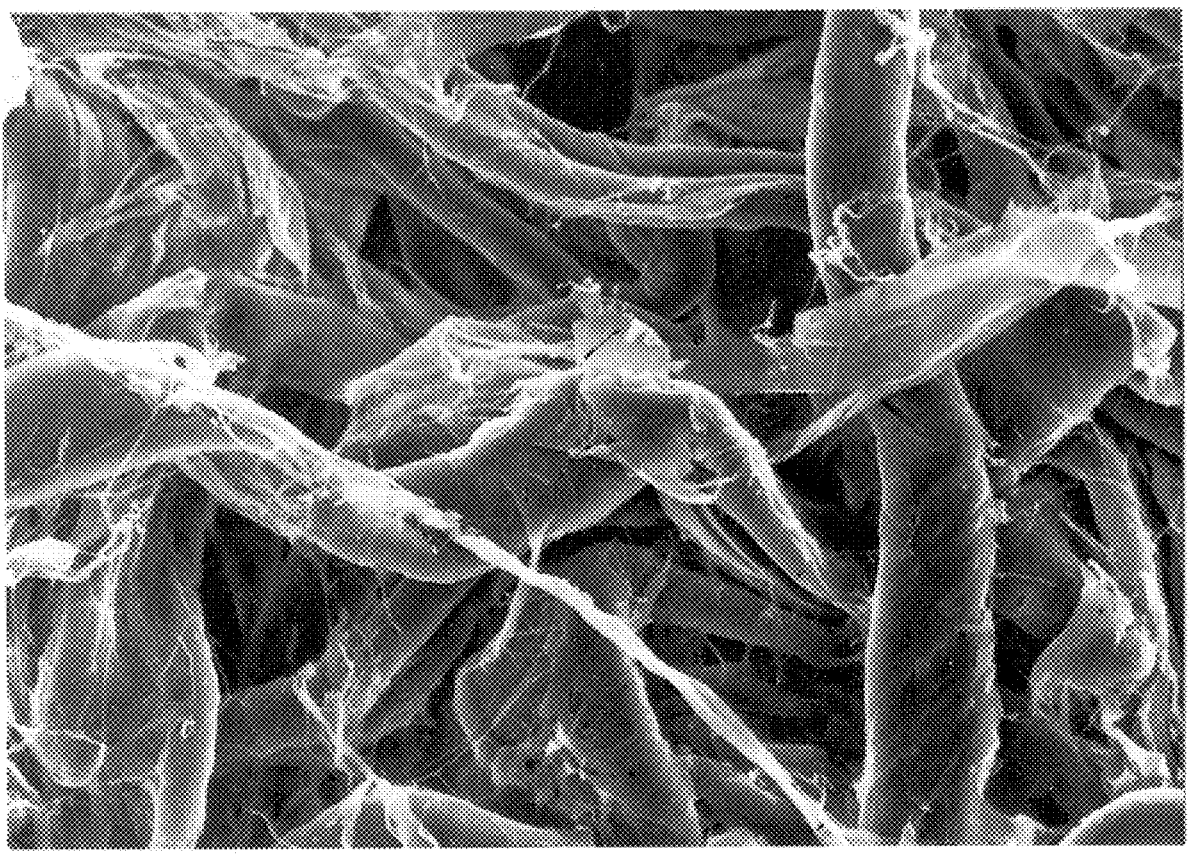
FIG. 4 is a scanning electron micrograph (1100× magnification) of the facial tissue paper product of the present invention.
Figure 5:
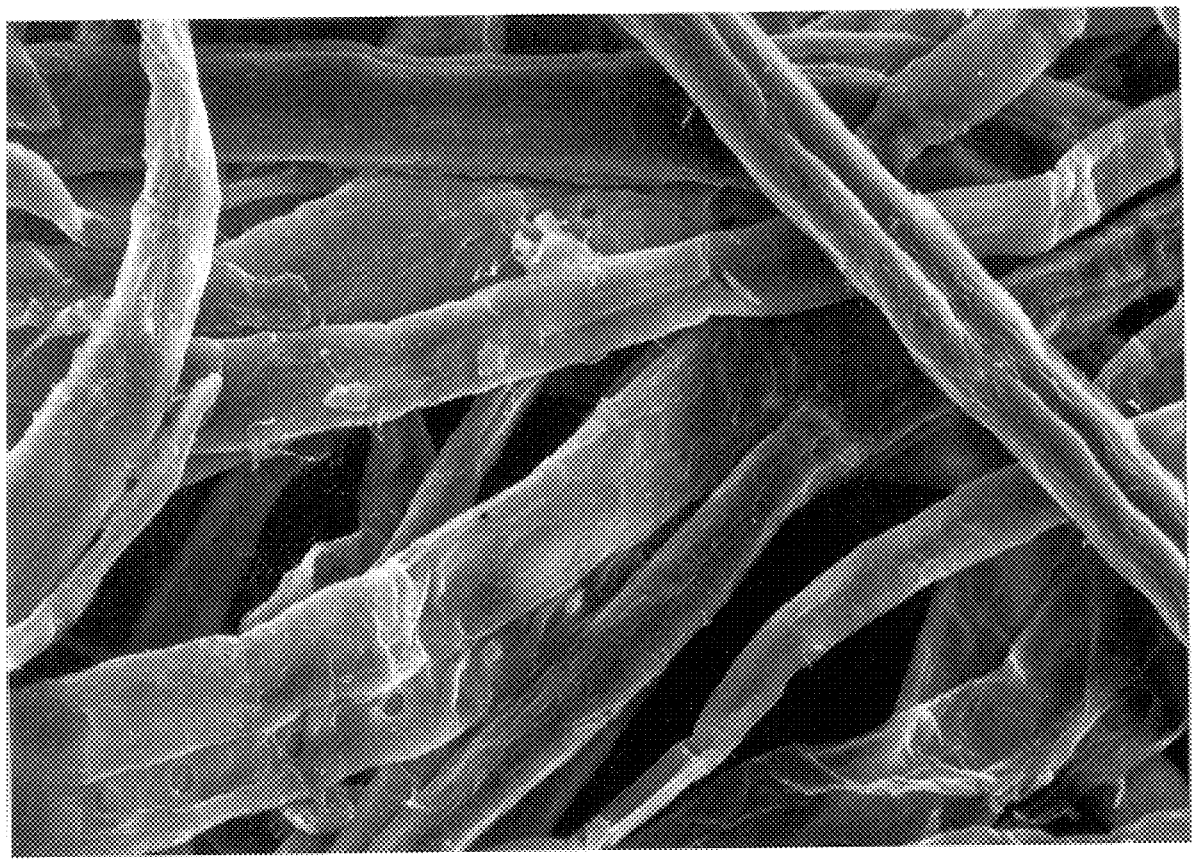
FIG. 5 is a scanning electron micrograph (1100× magnification) of a facial tissue paper product manufactured by Kimberly-Clark Corporation under the trade designation "KLEENEX" ("KLEENEX facial tissue").
Figure 6:
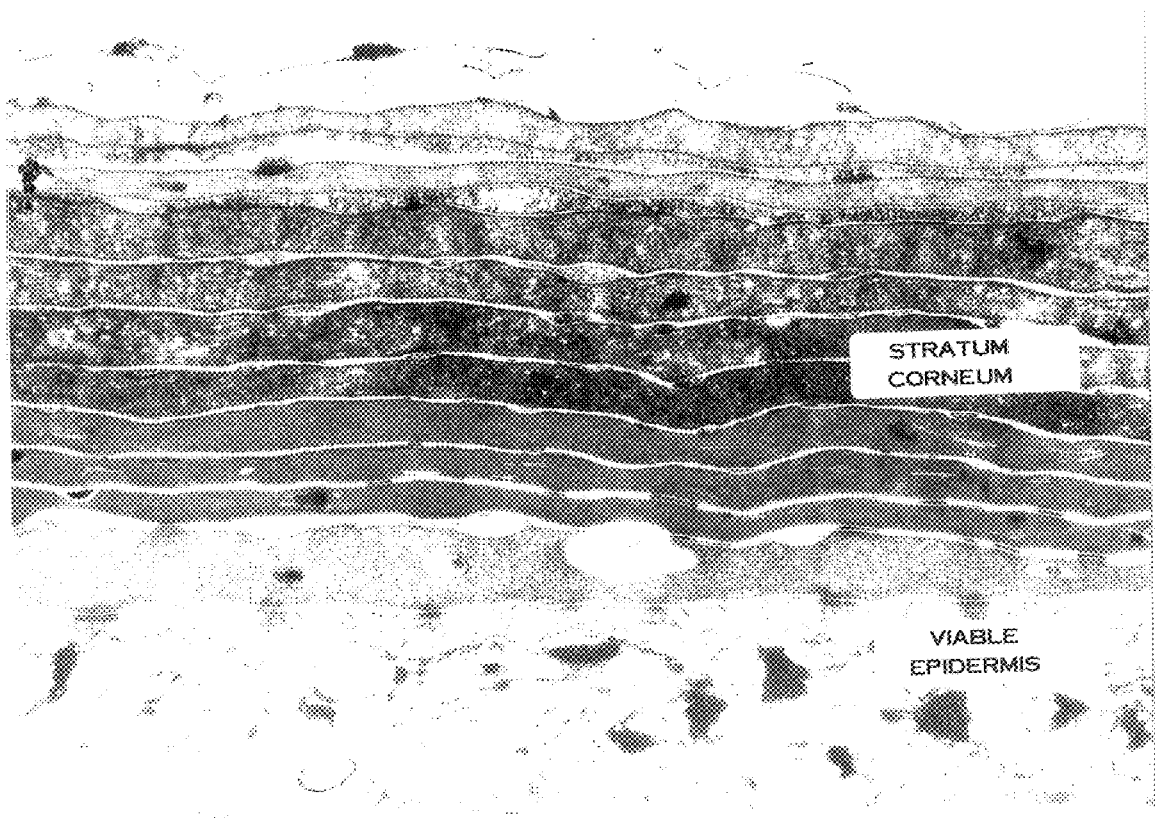
FIG. 6 is an 8 mm electron micrograph (8900×3.7 magnification) of a skin sample obtained by way of a 2 mm punch biopsy from facial areas showing the stratum corneum and viable epidermis skin layers.
Figure 7:
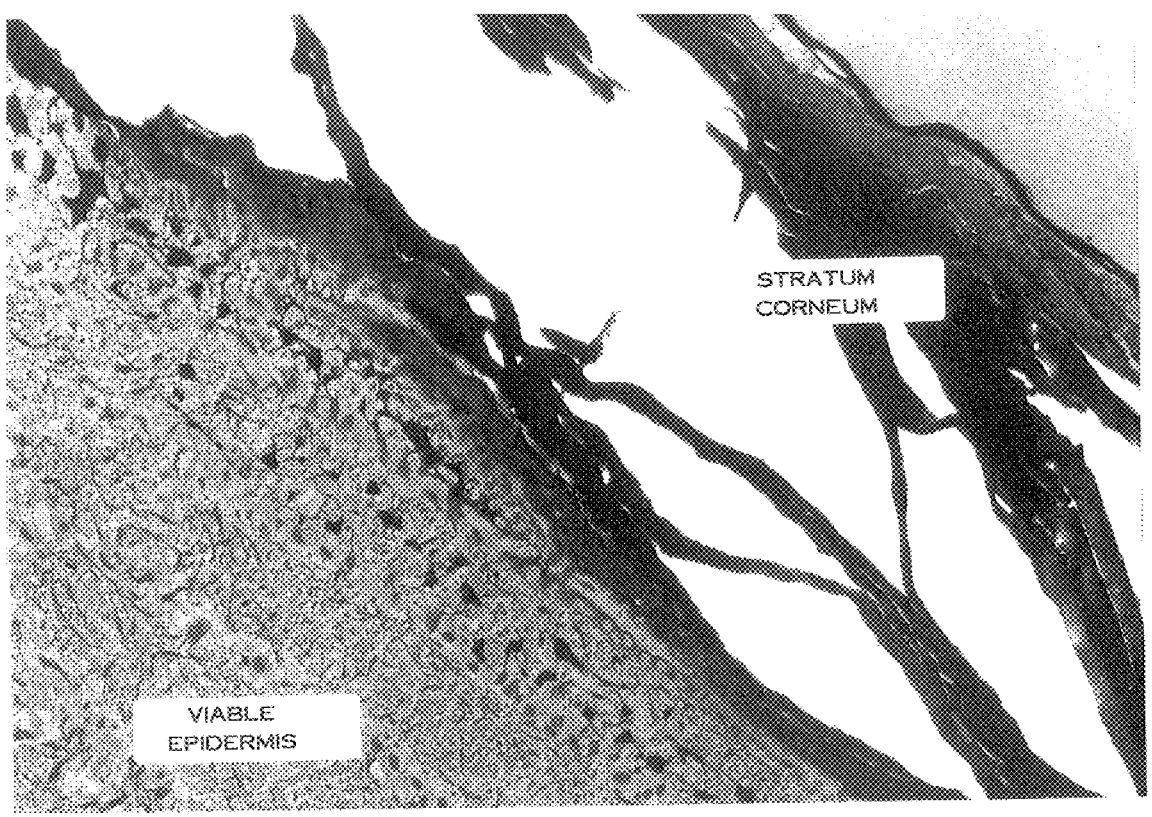
FIG. 7 is a 8 mm electron micrograph (8900×3.7 magnification) of a skin sample obtained by way of a 2 mm punch biopsy from facial areas showing the ultrastructure changes to the stratum corneum skin layer resulting from 5 days use of KLEENEX facial tissue.
Figure 8:
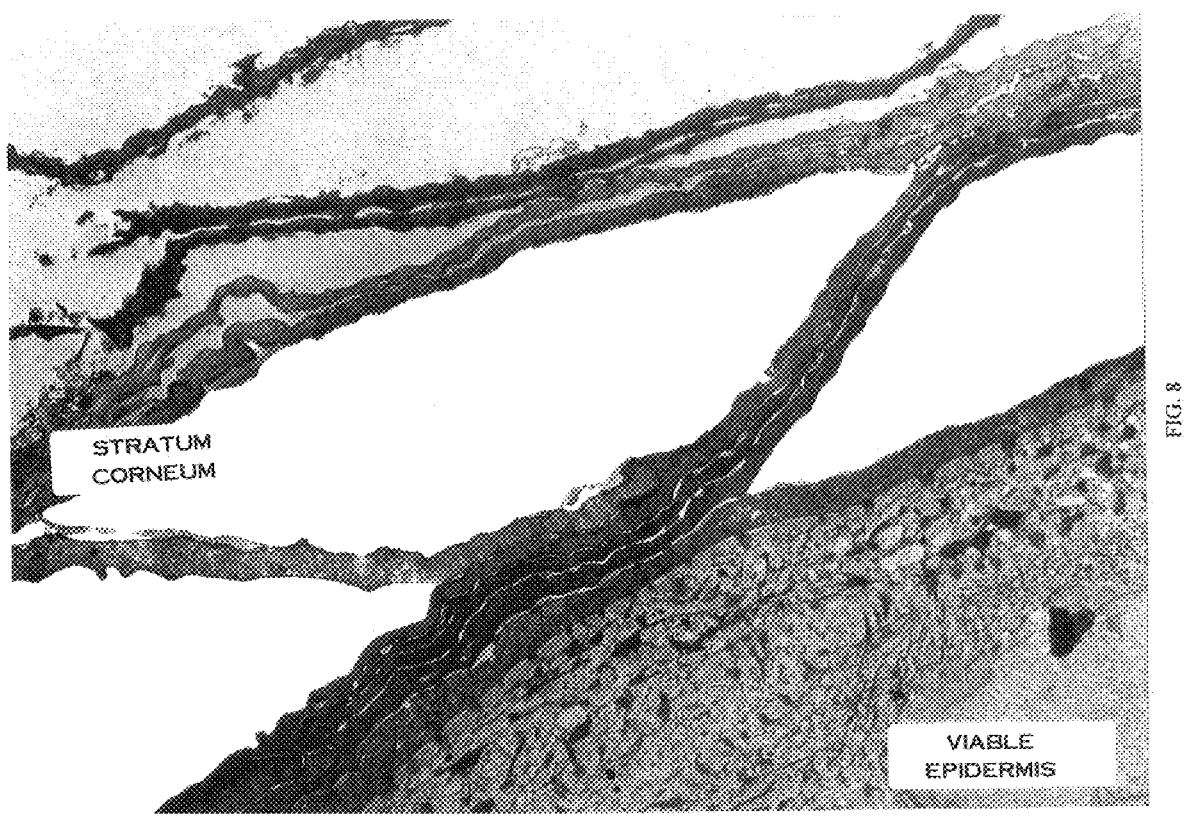
FIG. 8 is a 8 mm electron micrograph (8900×3.7 magnification) of a skin sample obtained by way of a 2 mm punch biopsy from facial areas showing the ultrastructure changes to the stratum corneum skin layer resulting from 5 days use of a facial tissue paper product manufactured by The Proctor & Gamble Company, Inc. under the trade designation "PUFFS PLUS" ("PUFFS PLUS facial tissue")
Figure 9:
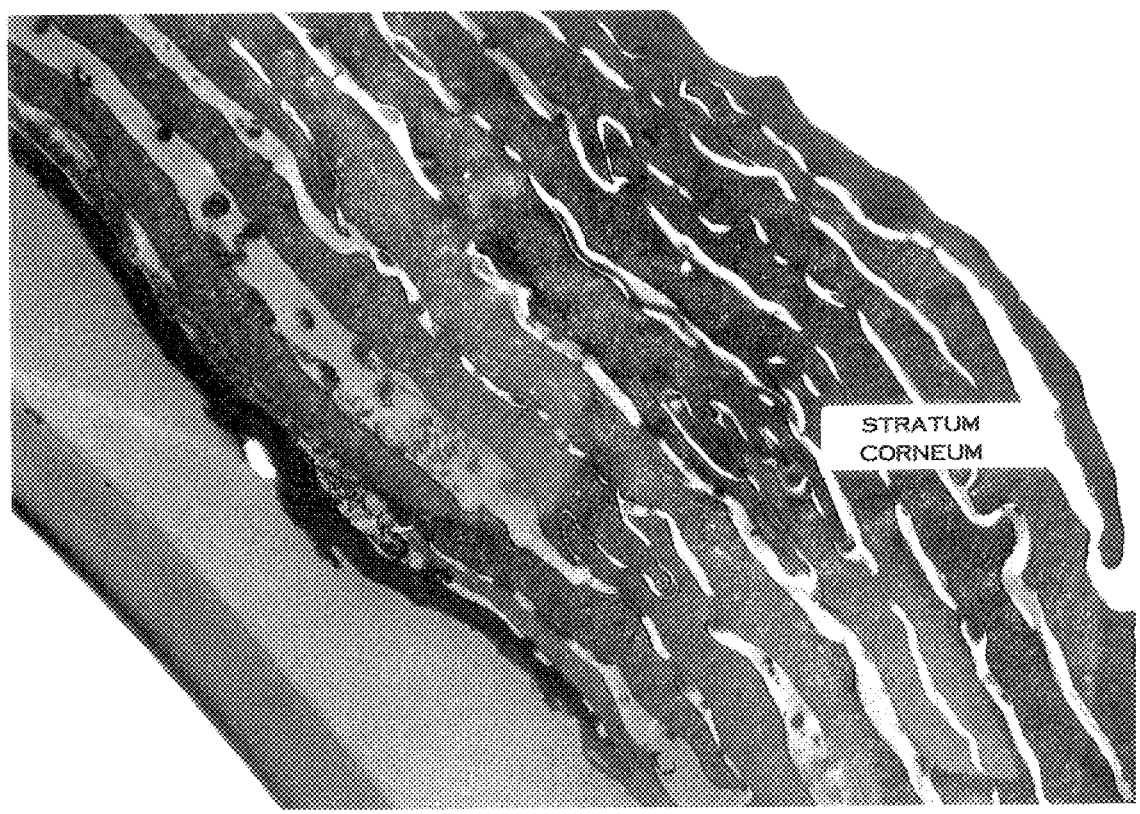
FIG. 9 is a 8 mm electron micrograph (8900×3.7 magnification) of a skin sample obtained by way of a 2 mm punch biopsy from facial areas showing the ultrastructure changes to the stratum corneum skin layer resulting from 5 days use of the facial tissue paper product of the present invention.

Referring now to the drawings in detail, scanning electron micrographs of the present inventive bathroom and facial tissue paper products are shown along with scanning electron micrographs of CHARMIN and COTTONELLE bathroom tissues and KLEENEX facial tissue. FIGS. 1 to 5 demonstrate the marked differences in fiber orientation and structure between the cotton linter fiber tissue paper products of the present invention and the prior art wood fiber tissue paper products. In particular, the fibers shown in FIGS. 1 and 4 have a smooth "ribbon-like" structure and demonstrate a greater degree of fibrillation. These fibers are arranged in more regular whorls than the more disorganized wood pulp fibers of the prior art tissue paper products and appear more flexible suggesting greater fiber-to-fiber contact and better bonding. In marked contrast, FIGS. 2, 3 and 5 show wood fibers that tend to remain straighter and stiffer, are less "conforming" when in contact with other fibers and show a lesser degree of fibrillation.

SPECIFIC EXAMPLES

EXAMPLE NO. 1

A pilot study was undertaken for the purpose of determining whether the use of the present inventive tissue product (as compared to conventional wood-based tissue products) by women who had recently undergone normal vaginal deliveries would serve to reduce perineal irritation after perineal repair. Perineal irritation or discomfort following perineal repair is common after a vaginal delivery. Correct suturing of episiotomies or perineal tears may help to reduce discomfort, but other factors may be important.

In the subject study, one hundred women who had a normal vaginal delivery with perineal repair (either a second degree tear or episiotomy) at Queen Charlotte's and Chelsea Hospital in London, England, during the months of August to December 1996, were recruited. Women with a first or third degree tear or a history of perineal problems were excluded. The women were recruited on the first day postpartum with informed written consent. Randomization was by computer generated random numbers and each participant was given ten rolls of either the present inventive tissue product or a conventional wood based tissue product in sealed packages labeled A (48 women) or B (52 women), respectively. Both the investigators and the subjects were blinded to the type of tissue allocated and the identities of tissues A and B were not revealed until after the results had been analyzed.

A questionnaire was completed 24 hours post-delivery with a visual analogue score (scale 0–100 millimeters) to assess perineal pain. A second postal questionnaire was sent to each woman eight weeks postnatally. Again a visual analogue score was used to assess perineal discomfort, and the investigators asked questions regarding perineal itching and swelling, resumption of sexual intercourse, bowel habits and breast-feeding.

The investigators received 92 completed questionnaires, 46 from Group A and 46 from Group B. The results were analyzed by $Chi^2$ tests for the comparable data, and t-tests for the mean pain scores. The results are shown in Table 1 hereinbelow:

TABLE 1

Summary of Pilot Study Results

| Pilot Study Participants | Group A (n = 46) | Group B (n = 46) | P Value |
| --- | --- | --- | --- |
| No. with episiotomy | 9 (20%) | 18 (39%) | 0.04 |
| No. with 2nd degree tear | 37 (80%) | 28 (61%) | 0.04 |
| At 8 Weeks | | | |
| No. with perineal pain | 4 (9%) | 7 (15%) | 0.41 |
| No. with perineal itching | 4 (9%) | 11 (24%) | 0.048 |
| No. with perineal swelling | 1 (2%) | 4 (9%) | 0.80 |
| No. still breastfeeding | 34 (74%) | 32 (70%) | 0.64 |
| No. resumed sexual intercourse | 20 (43%) | 28 (61%) | 0.10 |
| No. with pain on intercourse | 3 (15%) | 7 (25%) | 0.40 |

There were no significant differences between the two groups of women in terms of mean birth weights, parity, or incidence of piles 24 hours after delivery. There were significantly more episiotomies performed in group B than group A, but there were no differences in suture material or technique used, and comparable numbers were sutured by midwives and doctors.

Similar numbers in each group complained of constipation, had never breast-fed or were still breast-feeding at eight weeks, and had resumed sexual intercourse. There were no significant differences between the two groups in mean perineal pain scores at 24 hours postnatally, and no difference in improvement in pain scores or perineal swelling. Fewer women using the inventive tissue product complained of perineal pain or swelling at eight weeks. There were significantly fewer women with perineal itching at eight weeks in those who had used the inventive tissue product, 4 of 46 (9%), compared to 11 of 46 (24%) in those who had used the wood-based paper product (P<0.05).

This study suggests that the use of the present inventive tissue product may reduce perineal irritation as demonstrated by less pain, itching and swelling at eight weeks after perineal repair following normal vaginal delivery.

EXAMPLE NO. 2

Absorbency Tests

1. Hydrophilicity.

Hydrophilicity of a tissue product refers to the propensity of the tissue paper product to be wetted with water. Absorbency or hydrophilicity may be quantified by determining the amount of water absorbed by tissue paper samples within set time periods and by determining the total time required for each sample to achieve maximum absorbency.

For the present example, the procedure detailed in ASTM D5801-95 was used to determine the absorptive ability of: the present inventive facial and bathroom tissue paper products; CHARMIN and COTTONELLE bathroom tissues; and PUFFS and KLEENEX facial tissues.

Samples were placed on separate horizontal test plates such that a bottom surface rested on the plate and an upper surface was covered by a test weight. Each test plate was connected to a separate liquid reservoir by means of a siphon tube. Each liquid reservoir was placed on an electronic balance. Liquid was absorbed into the sample. The resulting reduction in the liquid present in the reservoir was measured by the balance and recorded by a connected computer.

The test conditions described in this procedure include a negative liquid head pressure. The surface of the liquid in the reservoir was below the bottom surface of the sample in contact with the test plate.

For the subject evaluation, five sample sheets measuring 50±1 mm in diameter for each tissue paper sample to be tested were provided. The liquid reservoir, containing approximately 200 ml of water, was placed on the electronic balance. A 60 ml syringe was attached to the end of tubing connected to the reservoir, and used to pull water through the tubing until it was filled. The tubing was then connected to a hose barb on a 50 mm diameter test plate positioned on a platform and the balance was tared. A specimen was placed on the plate and a 50 g weight was set on top of the specimen to ensure even contact between the specimen and the liquid.

The platform was adjusted until the water in the tubing contacted the specimen. The negative liquid head pressure was maintained by having the specimen approximately 4 mm below the surface of the water in the liquid reservoir. The balance and computer were set to record the weight of the water in the liquid reservoir every 3 seconds. The specimen was allowed to absorb water until the rate of absorption was less than 0.01 g per 15 seconds at which point the specimen was assumed to be saturated.

The amount of water absorbed according to the electronic balance was recorded by the computer. The saturated specimen was removed. The test plate was dried and the liquid reservoir refilled. The procedure was repeated on the remaining four sample sheets and the results averaged. The procedure was then repeated on the remaining test specimens.

The results of the above-referenced absorbency or hydrophilicity tests are tabulated in Table 2 hereinbelow:

TABLE 2

| SAMPLES | Weight of Water (g) Absorbed at | |
| --- | --- | --- |
| | 3 seconds | 9 seconds |
| Bathroom Tissue | | |
| Present Invention | 0.51 | 1.01 |
| CHARMIN | 0.05 | 0.84 |
| COTTONELLE | 0.06 | 0.72 |
| Facial Tissue | | |
| Present Invention | 0.06 | 0.71 |

TABLE 2-continued

| SAMPLES | Weight of Water (g) Absorbed at | |
|---|---|---|
| | 3 seconds | 9 seconds |
| PUFFS | 0.07 | 0.40 |
| KLEENEX | 0.02 | 0.62 |

The absorbency or hydrophilicity test results detailed in Table 2 demonstrate that the present inventive bathroom and facial tissue paper products have a greater propensity to be wetted with water as compared to prior art commercial bathroom and facial tissues.

2. Bacteria Absorbency Test.

a. Staphylococcus Aureus

For this test, the above-referenced procedure (i.e., ASTM D5801-95) was repeated using staphylococcus aureus ATCC #6538 as the liquid challenge solution.

The results of the above-referenced staphylococcus aureus absorbency test are tabulated in Table 3 hereinbelow:

TABLE 3

| SAMPLES | *Staphylococcus Aureus* Liquid Challenge Solution (g) Absorbed at | |
|---|---|---|
| | 3 seconds | 6 seconds |
| Bathroom Tissue | | |
| Present Invention | 0.44 | 0.93 |
| CHARMIN | 0.07 | 0.74 |
| COTTONELLE | 0.07 | 0.61 |
| Facial Tissue | | |
| Present Invention | 0.19 | 0.79 |
| PUFFS | 0.05 | 0.15 |
| KLEENEX | 0.06 | 0.42 |

Consistent with the hydrophilicity test results detailed above, the staphylococcus aureu absorbency test results detailed in Table 3 demonstrate that the present inventive bathroom and facial tissue paper products absorb considerably greater amounts of staphylococcus aureus bacteria as compared to prior art commercial bathroom and facial tissues.

b. Candida Albicans

For this test, the above-referenced procedure (i.e., ASTM D5801-95) was repeated using candida albicans ATCC #10231 as the liquid challenge solution.

The results of the above-referenced candida albicans absorbency test are tabulated in Table 4 hereinbelow:

TABLE 4

| SAMPLES | *Candida Albicans* Liquid Challenge Solution (g) Absorbed at | | |
|---|---|---|---|
| | 3 seconds | 6 seconds | 9 seconds |
| Bathroom Tissue | | | |
| Present Invention | 0.19 | 0.84 | 0.97 |
| CHARMIN | 0.42 | 0.81 | 0.91 |
| COTTONELLE | 0.08 | 0.61 | 0.83 |
| Facial Tissue | | | |
| Present Invention | 0.37 | 0.82 | 0.93 |

TABLE 4-continued

| SAMPLES | *Candida Albicans* Liquid Challenge Solution (g) Absorbed at | | |
|---|---|---|---|
| | 3 seconds | 6 seconds | 9 seconds |
| PUFFS | 0.05 | 0.15 | 0.34 |
| KLEENEX | 0.08 | 0.45 | 0.67 |

The candida albicans absorbency test results detailed in Table 4 demonstrate that the inventive facial tissue absorbs considerably greater amounts of candida albicans bacteria as compared to PUFFS and KLEENEX facial tissues. In addition, the inventive bathroom tissue product absorbed more candida albicans bacteria than COTTONELLE bathroom tissue. It is noted that although CHARMIN bathroom tissue performed better in the 3 second test, the present inventive bathroom tissue product outperformed CHARMIN and COTTONELLE in the 6 and 9 second tests.

3. Urine Absorbency Test

For this test, the above-referenced procedure (i.e., ASTM D5801-95) was repeated using synthetic urine as the liquid challenge solution.

The results of the above-referenced urine absorbency test are tabulated in Table 5 hereinbelow.

TABLE 5

| SAMPLES | Urine (g) Absorbed at 3 seconds |
|---|---|
| Bathroom Tissue | |
| Present Invention | 0.46 |
| CHARMIN | 0.36 |
| COTTONELLE | 0.03 |
| Facial Tissue | |
| Present Invention | 0.46 |
| PUFFS | 0.04 |
| KLEENEX | 0.07 |

The water absorbency test results detailed in Table 5 demonstrate that the inventive bathroom and facial tissue paper products absorb greater amounts of urine as compared to prior art commercial bathroom and facial tissues.

EXAMPLE NO. 3

Abrasion Tests

For the present example, the following procedure was used to determine the level of surface abrasion on a polycarbonate lens produced by: the facial and bathroom tissue paper products of the present invention; CHARMIN bathroom tissue; and KLEENEX facial tissue. For this procedure, twelve sample sheets measuring 21.75 cm×21.3 cm for each tissue paper sample to be tested were provided. Each sample sheet was folded in half and then folded in half again and the folded sheet placed on a pad located on a mechanical abrader. The mechanical abrader was digitized to complete a specific number of cycles in a given period. An uncoated polycarbonate lens was then measured for haze using a BKY Gardner Hazemeter Plus and then fixably attached to the abrader. The pad on which the folded sheet was placed was put into contact with the lens at a specified pressure, best simulating normal wiping pressure. The folded sheet was then rubbed against the lens for a total of 1200 cycles. The lens was then once again measured for haze. The haze measurements taken before and after abrading were subtracted from each other. The procedure was repeated for the remaining eleven sample sheets and the average of the level of surface abrasion or increase in haze measurements for the twelve sample sheets was then calculated. The above-referenced procedure was then repeated for the remaining tissue paper products.

The results are tabulated in Table 6 hereinbelow.

TABLE 6

Increase In Haze (after 1200 cycles)

| SAMPLES | SAMPLE NO. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Bathroom Tissue | | | | | | | | | | | | |
| Present Invention | 8.1 | 5.2 | 7.4 | 6.8 | 7.2 | 3.8 | 3.8 | 7.4 | 4.0 | 4.8 | 2.8 | 3.4 |
| CHARMIN | 9.0 | 10.8 | 10.9 | 6.2 | 8.8 | 2.4 | 8.4 | 7.5 | 5.4 | 11.6 | 6.4 | 3.6 |
| Facial Tissue | | | | | | | | | | | | |
| Present Invention | 1.0 | 1.2 | 0.8 | 0.7 | 1.6 | 1.2 | 0.8 | 2.1 | 2.2 | 0.5 | 1.4 | 1.0 |
| KLEENEX | 4.1 | 1.4 | 1.8 | 1.7 | 3.1 | 3.6 | 10.2 | 3.0 | 2.8 | 4.7 | 4.2 | 5.2 |

The level of surface abrasion test results detailed in Table 6 demonstrate that the present inventive bathroom and facial tissue paper products are less abrasive than the prior art bathroom and facial tissue paper products tested.

EXAMPLE NO. 4

Dirt and Cleaning Tests

For the present example, the following procedure was used to determine the level of dirt and soil removal from the surface of a hard resin lens effected by: the facial and bathroom tissue paper products of the present invention; CHARMIN and COTTONELLE bathroom tissues; and PUFFS and KLEENEX facial tissues. For this procedure, dirt and oil was placed on a hard resin lens in a specified manner so that the same amount and location were precisely repeatable for each lens used during the test. A different lens and tissue paper sample was used each time. The machine used for this test allowed the tissue to come into contact with the lens at a predetermined pressure for 5 cycles. The lens, with the dispersion of dirt and oil on it, was initially measured for haze using a BKY Gardner Hazemeter Plus. The lens was then affixed to the machine for the completion of 5 cycles. The lens was then removed from the machine and measured for haze. The lens was then placed in the machine for another 5 cycles. This procedure was repeated for a total of 60 cycles.

In accordance with the above, thirty-six sample sheets measuring 21.75 cm×21.3 cm for each tissue paper sample to be tested were provided. Each sample sheet was folded in half and then folded in half again. The folded sheet was then tested as described above.

The results are tabulated in Table 7 hereinbelow.

TABLE 7

Increase In Haze (after 60 cycles)

| SAMPLES | SAMPLE NO. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Bathroom Tissue | | | | | | | | | | | | |
| Present Invention | .09 | .03 | .02 | .06 | .04 | .09 | .07 | .05 | .06 | .02 | .05 | .05 |
| CHARMIN | .15 | .22 | .15 | .11 | .10 | .14 | .12 | .14 | .17 | .14 | .14 | .12 |
| COTTONELLE | .16 | .15 | .15 | .11 | .14 | .14 | .16 | .08 | .10 | .16 | .15 | .14 |
| Facial Tissue | | | | | | | | | | | | |
| Present Invention | .06 | .06 | .06 | .06 | .09 | .06 | .06 | .05 | .04 | .07 | .04 | .03 |
| PUFFS | .23 | .27 | .22 | .32 | .27 | .27 | .18 | .30 | .20 | .35 | .37 | .27 |
| KLEENEX | .08 | .06 | .11 | .17 | .15 | .06 | .13 | .08 | .07 | .10 | .05 | .11 |

The level of dirt and soil removal test results detailed in Table 7 demonstrates that the present inventive bathroom and facial tissue paper products are far better at removing dirt and soil from the surface of a hard resin lens than the prior art bathroom and facial tissue paper products tested.

EXAMPLE NO. 5

Dry Linting Tests

In accordance with procedures detailed in IES-RP-CC-003-87-T, ASTM F51-68 (89)(E 1) and ASTM F50-96, the degree of dry Tinting demonstrated by the present inventive facial and bathroom tissue products, CHARMIN and COTTONELLE bathroom tissue products and PUFFS facial tissue product was determined.

Sample tissue products were tested by placing the sample into a chamber of a stainless steel drum measuring approximately 43 cm in diameter and 33 cm in width, which was capable of being rotated at 10 revolutions per minute (RPM). Cleats were located within the chamber.

The rotatable drum along with a drive unit was placed into a class 100 laminar flow hood. An air sampling tube was positioned inside the drum chamber to withdraw air from the chamber. An open end of a collection tube was adjusted to be within 24.3 mm of the cleats within the chamber and positioned approximately at the center.

The air sampling tube was connected to a laser particle counter using a 4–5 foot length of flexible tubing. The laser particle counter was allowed to warm up for a minimum of 15 minutes prior to testing.

Particle density inside the empty rotating chamber was determined for three one minute intervals. Acceptable background counts were <100 particles ($\geq 0.5$ μm)/minute. The chamber was allowed to rotate until acceptable counts were obtained. Cleaning of the interior of the chamber was performed using isopropyl alcohol and low-linting cleanroom wipes. When the background particle density counts were acceptable, the test articles were placed in the rotating chamber and counts were collected for 10 minutes.

A blank control was determined for the rotating chamber by running three one minute counts with no test material in the chamber. The average of the three minute blank counts was subtracted from the test sample counts.

The test apparatus was maintained in a stationary position inside an HEPA filter clean bench. The test sample was carefully removed from its protective packaging and placed into the rotating chamber. The drive unit and particle counter were immediately turned on and a timer set for 10 minutes. The number of particles/minute $\geq 5$ μm were reported after subtracting out the blank control. In addition to being tested as a complete specimen, each sample was also tested after it was torn in half.

The results obtained pursuant to the above-referenced test are tabulated in Table 8 hereinbelow.

desquamation. Following the removal of the D-SQUAME plastic films, one sheet of a sample tissue product was mechanically rubbed (swirling action) on the left and right side of the face (mid-line) of each test subject for 30 seconds by a technician. The contralateral side of the face of each test subject was then mechanically rubbed (swirling action) for 30 seconds by the technician. After 15 minutes, pieces of D-SQUAME plastic film were firmly pressed against the skin at both treatment sides of the face of each test subject for 15 seconds. The D-SQUAME plastic films were then removed and affixed to black areas contained on the above-identified reference cards. Increasing levels of desquamation were indicated by the visual presence or absence of skin scales. The presence of increasing levels of skin scales indicated heavier desquamation (i.e., moderate micro-abrasion to the skin).

After a one hour rest, the 30 second mechanical rubbing procedure with the sample tissue products was repeated, along with a 15 minute rest, and the application of the D-SQUAME plastic films. Following an additional one hour rest period, the mechanical and desquamation process sampling occurred as a final treatment and the results were tabulated. A final visual evaluation of the face of each test subject was performed following the three treatments. The visual evaluation entailed utilizing a four-point clinical scale to measure erythema, edema, papules, and vesicles of the skin (per North American Contact Dermatitis Group).

TABLE 8

Particle Count

| SAMPLES | SAMPLE NO. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Bathroom Tissue | | | | | | | | | | | | |
| Present Invention | 2,700 | 4,000 | 5,600 | — | — | — | — | — | — | — | — | — |
| CHARMIN | 7,000 | 5,800 | 8,500 | — | — | — | — | — | — | — | — | — |
| COTTONELLE | 5,600 | 7,400 | 8,400 | — | — | — | — | — | — | — | — | — |
| Facial Tissue | | | | | | | | | | | | |
| Present Invention | 4 | 3 | 7 | 8 | 4 | 11 | 9 | 4 | 4 | 4 | 4 | 2 |
| PUFFS | 27 | 16 | 35 | 80 | 36 | 35 | 23 | 62 | 28 | 28 | 70 | 73 |
| KLEENEX | 23 | 18 | 15 | 10 | 17 | 23 | 16 | 9 | 15 | 17 | 12 | 11 |

The degree of dry linting test results detailed in Table 8 demonstrate that the present invention deposits or generates considerably less lint particle residue as compared to the prior art tissue products tested.

EXAMPLE NO. 6

Facial Skin Irritation Test

For the present example, the following procedure was used to determine the degree of abrasion on facial skin caused or generated by the present inventive facial tissue paper product and by KLEENEX and PUFFS facial tissue products. For this test or study, which was conducted by the California Skin Research Institute (CSRI), San Diego, Calif., sixty-three test subjects participated in a three day "wash-out" period using quilted facial squares and TUCKS disposable anogenital toilet towelettes. On day one, baseline visual facial evaluations on each test subject were performed. D-SQUAME (CuDerm Corporation, Dallas, Tex.) plastic films were affixed to the right and left cheeks and to the left and right forehead of each test subject by pressing the plastic film firmly against the skin for 15 seconds. The plastic films were then removed and affixed to black areas contained on reference cards that were designed to provide indications of semi-quantitative levels of skin desquamation. These plastic films served as a baseline for corneocyte A greater degree in reduction in desquamation was an indication of a lower level of abrasiveness. The results of the above-referenced facial skin irritation test are tabulated in Table 9 hereinbelow.

TABLE 9

| SAMPLES Facial Tissue | Reduction in Degree of Desquamation (%) |
|---|---|
| Present Invention | 64 |
| KLEENEX | 36 |
| PUFFS | 36 |

The test results detailed in Table 9 demonstrate that the KLEENEX and PUFFS facial tissue paper products are almost twice as irritating to facial skin as the facial tissue paper product of the present invention.

EXAMPLE NO. 7

Microscopic Ultrastructure Damage to Normal Skin

Electron microscopic ultrastructure changes to normal skin as a result of five days of controlled use of either the facial tissue paper product of the present invention, KLEENEX facial tissue or PUFFS PLUS facial tissue, were assessed. For this assessment, which was also conducted by CSRI, twenty test subjects initially participated in a three day "wash out" period using NEUTROGENA glycerin soap and a generic quilted facial tissue supplied by CSRI to ensure that all test subjects'facial skin was essentially treated under the same clinical conditions prior to the start of the study. On day one of the study (baseline), subjects received visual clinical evaluations. In addition, Chromameter (Minolta CR300) readings were performed on the right and left perauricular region of the ear, forehead, chin and cheeks of each test subject with a microprobe 8 mm aperture. The Chromameter provided objective evidence of clinical and subclinical erythema (redness) based on refractive indice readings bouncing off the skin and detected by the instrument. On day one and for the following four days, each test subject used either the present inventive facial tissue product, KLEENEX facial tissue or PUFFS PLUS facial tissue and completed a diary documenting the use of the test samples. All test subjects were blinded to the type or brand of facial tissue product received pursuant to this study. On day six of the study, a 2 mm punch biopsy from the facial area of each test subject was obtained and electron micrographs taken of these tissue samples for the purpose of showing the ultrastructure changes to the stratum corneum skin layer as a result of the five days of controlled use of the respective test samples. The electron micrographs showing a baseline skin sample and skin samples from representative test subjects showing the ultrastructure changes to the stratum corneum skin layer of the test subject after use of one of the above-referenced tissue paper products are displayed in FIGS. 6, 7, 8 and 9, respectively.

The mean A° tissue separation resulting from the five days of controlled use of the respective test samples was determined by measuring the distance from the uppermost region of separation from the epidermis to the stratum corneum as shown in the subject electron micrograph. This was determined using a nomogram designed primarily for determining the size and distance of an object from its electron microscopic image (J. Submicrosc. Cytol. 13, 95, 1981). The results are set forth in Table 10 hereinbelow.

TABLE 10

| SAMPLES Facial Tissue | Mean A° Tissue Separation |
| --- | --- |
| Present Invention | 20 |
| KLEENEX | 212 |
| PUFFS PLUS | 120 |

The test results detailed in Table 10 and shown in FIGS. 6 to 9 demonstrate the significantly less damaging effect of the present invention on normal skin as compared to KLEENEX and PUFFS PLUS facial tissues. The fact that the stratum corneum skin layer is left intact after use of the present inventive tissue paper product as compared to the observed separation of this skin layer caused from use of the referenced prior art tissue products is dramatic evidence of the less abrasive and damaging nature of the present invention.

Although this invention has been shown and described with respect to detailed embodiments thereof, it will be understood by those skilled in the art that various changes in form and detail thereof may be made without departing from the spirit of the claimed invention.

Having thus described the invention, what is claimed is:

1. A soft, bright and strong tissue paper product prepared from fibers consisting essentially of raw cotton linter fibers having an average fiber length of from about 2 to about 16 millimeters, wherein said prepared tissue paper product comprises: cotton linter fibers having an average fiber length of from about 0.3 to about 3.0 millimeters and an effective amount of a cationic starch derivative binder.

2. The soft, bright and strong tissue paper product of claim 1, wherein said raw cotton linter fibers are second cut cotton linters having an average fiber length of from about 3 to about 5 millimeters, a dirt and seed fragment content of less than or equal to 12% by weight and a staple fiber and gin mote remnant content of less than or equal to 3% by weight.

3. The soft, bright and strong tissue paper product of claim 1, wherein said raw cotton linter fibers comprise a blend of second and third cut cotton linter fibers, wherein said blend comprises:

second cut cotton linter fibers having an average fiber length of from about 3 to about 6 millimeters, a dirt and seed fragment content of less than or equal to 14% by weight and a staple fiber and gin mote remnant content of less than or equal to 5% by weight; and staple fiber and gin mote remnant-free third cut cotton linter fibers having an average fiber length of from about 2 to about 3 millimeters and a dirt and seed fragment content of less than or equal to 16% by weight.

4. The soft, bright and strong tissue paper product of claim 3, wherein said blend comprises from about 20 to about 50% by weight of said second cut cotton linter fibers and from about 80 to about 50% by weight of said third cut cotton linter fibers.

5. The soft, bright and strong tissue paper product of claim 1, wherein said raw cotton linter fibers have an average fiber length of from about 2 to about 10 millimeters.

6. The soft, bright and strong tissue paper product of claim 1, wherein said raw cotton linter fibers have an average fiber length of from about 4 to about 6 millimeters.

7. The soft, bright and strong tissue paper product of claim 1, wherein said raw cotton linter fibers have an average coarseness measurement of from about 25 to about 70%.

8. The soft, bright and strong tissue paper product of claim 1, wherein said raw cotton linter fibers have an average coarseness measurement of from about 35 to about 55%.

9. The soft, bright and strong tissue paper product of claim 1, wherein said cationic starch derivative is a starch derived from corn or potatoes that has been chemically modified so as to impart a cationic moiety.

10. The soft, bright and strong tissue paper product of claim 9, wherein said cationic starch derivative is a potato starch.

11. The soft, bright and strong tissue paper product of claim 1, wherein said tissue paper product is a facial tissue paper product that further comprises from about 0.05 to about 3.0% by weight of a wet-strength resin.

12. The soft, bright and strong tissue paper product of claim 1, wherein said tissue paper product is a two-ply tissue paper product wherein each ply is a single layer that comprises cotton linter fibers having an average fiber length of from about 0.3 to about 3.0 millimeters and an effective amount of a cationic starch derivative binder.

13. A soft, bright and strong tissue paper product prepared from fibers consisting essentially of raw cotton linter fibers having an average fiber length of from about 2 to about 16 millimeters, wherein said prepared tissue paper product comprises: cotton linter fibers having an average fiber length of from about 0.3 to about 3.0 millimeters and an effective amount of a cationic starch derivative binder, wherein said prepared tissue paper product has a basis weight of from about 1 to about 35 grams per square meter, a density of between about 0.02 and about 0.39 grams per cubic centimeter, a machine direction tensile strength of greater than or equal to 140 grams per inch and a cross direction tensile strength of from about 60 to about 70% of said machine direction tensile strength.

14. A soft, bright and strong one-ply tissue paper product that comprises: a first and a second outer layer prepared from fibers consisting essentially of raw cotton linter fibers having an average fiber length of from about 2 to about 16 millimeters, wherein said first and said second outer layers each comprise cotton linter fibers having an average fiber length of from about 0.3 to about 3.0 millimeters and an effective amount of a cationic starch derivative binder; and an inner layer located between said first and said second outer layers that comprises wood fibers, wherein said first and said second outer layers each have a caliper or thickness ranging from about 0.06 to about 0.35 millimeters.

15. A soft, bright and strong two-ply tissue paper product wherein each ply is a dual-layered sheet comprising: a first layer having a caliper or thickness of from about 0.02 to about 0.50 millimeters that is prepared from fibers consisting essentially of raw cotton linter fibers having an average fiber length of from about 2 to about 16 millimeters, wherein said first layer comprises cotton linter fibers having an average fiber length of from about 0.3 to about 3.0 millimeters and an effective amount of a cationic starch derivative binder; and a second layer having a caliper or thickness of from about 0.08 to about 0.80 millimeters that comprises wood fibers, and wherein said second layers of said dual-layered sheets are located between said first layers in said two-ply tissue paper product.

16. A soft, bright and strong tissue paper product prepared from raw cotton linter fibers having an average fiber length of from about 2 to about 16 millimeters, wherein said tissue paper product consists essentially of: cotton linter fibers having an average fiber length of from about 0.3 to about 3.0 millimeters; an effective amount of a cationic starch derivative binder; and from about 0.05 to about 3.0% by weight of a wet-strength resin.

17. A soft, bright and strong tissue paper sheet product consisting essentially of cotton linter fibers having an average fiber length of from about 0.3 to about 3.0 millimeters and an effective amount of a cationic starch derivative bimder that is prepared by a process that comprises:

selecting raw cotton linter fibers having an average fiber length of from about 2 to about 16 millimeters;

mechanically cleaning said selected fibers;

transferring said mechanically cleaned fibers to a digester vessel;

charging oxygen gas to said digester vessel in an amount of from about 0.11 to about 0.78 MPa per metric ton of fiber;

digesting said fibers in the presence of said oxygen gas to form a pulp;

bleaching said pulp by adding hydrogen peroxide thereto in an amount of from about 35 to about 90 kilograms per metric ton of pulp;

beating or refining said bleached pulp until an average fiber length of from about 0.3 to about 3.0 millimeters is achieved;

adding an effective amount of a cationic starch derivative binder to said refined pulp; and forming said pulp into a sheet.

18. A process for preparing a soft, bright and strong tissue paper sheet product prepared from fibers consisting essentially of cotton linter fibers wherein said process comprises:

selecting raw cotton linter fibers having an average fiber length of from about 2 to about 16 millimeters;

mechanically cleaning said selected fibers;

digesting said mechanically cleaned fibers to form a pulp;

bleaching said pulp;

beating or refining said bleached pulp until an average fiber length of from about 0.3 to about 3.0 millimeters is achieved; and forming the bleached and refined pulp into a sheet.

19. The process of claim 18, wherein said process further comprises:

saturating said mechanically cleaned fibers with a 1.8 to 5.6% caustic solution comprising sodium hydroxide and refined tall oil; and mechanically pressing said saturated fibers to achieve a fiber to caustic solution ratio ranging from about 1:3 to about 1:5.

20. The process of claim 18 or 19, wherein said mechanically cleaned fibers are digested in the presence of oxygen gas, wherein said oxygen gas is present in an amount ranging from about 0.11 to about 0.78 MPa per metric ton of fiber.

21. The process of claim 19, wherein said caustic solution further comprises a delignification agent comprising hydrogen peroxide.

22. The process of claim 19, wherein said process further comprises: neutralizing said pulp with carbon dioxide prior to bleaching.

23. The process of claim 18, wherein said mechanically cleaned fibers are digested at temperatures ranging from about 140° to about 195° C. and at pressures ranging from about 0.28 to about 1.24 MPa for a period of time ranging from about 25 minutes to about 3 hours.

24. The process of claim 23, wherein said digested fibers or pulp have a viscosity ranging from about 50 to 5,000 seconds.

25. The process of claim 18, wherein said pulp is bleached by adding a mixture of sodium chlorite and sodium hypochlorite to said pulp in an amount of from about 4 to about 12 kilograms of sodium chlorite per metric ton of pulp.

26. The process of claim 18, wherein said pulp is bleached by adding hydrogen peroxide to said pulp in an amount of from about 35 to about 90 kilograms per metric ton of pulp.

27. A process for preparing a soft, bright and strong tissue paper sheet product wherein said process comprises:

selecting raw cotton linter fibers having an average fiber length of from about 2 to about 16 millimeters;

mechanically cleaning said selected fibers;

charging oxygen gas to said digester vessel in an amount of from about 0.11 to about 0.78 MPa per metric ton of fiber;

digesting said fibers in the presence of said oxygen gas to form a pulp;

bleaching said pulp by adding hydrogen peroxide thereto in an amount of from about 35 to about 90 kilograms per metric ton of pulp;

beating and refining said bleached pulp until an average fiber length of from about 0.3 to about 3.0 millimeters is achieved; and forming the bleached and refined pulp into a sheet.

* * * * *

UNITED STATES PATENT AND TRADEMARK OFFICE
CERTIFICATE OF CORRECTION

PATENT NO. : 6,174,412 B1
DATED : January 16, 2001
INVENTOR(S) : Tim Paterson-Brown et al.

Page 1 of 1

It is certified that error appears in the above-identified patent and that said Letters Patent is hereby corrected as shown below:

Column 18,
Line 52, change "Tinting" to -- linting --.

Claim 17,
Line 5, change "bimder" to -- binder --.

Claim 27,
Line 2, after "product" insert -- prepared essentially of cotton linter fibers --.

Signed and Sealed this

Twenty-third Day of October, 2001

Attest:

NICHOLAS P. GODICI
Attesting Officer *Acting Director of the United States Patent and Trademark Office*